United States Patent
Shen et al.

(10) Patent No.: US 9,325,690 B2
(45) Date of Patent: *Apr. 26, 2016

(54) VERIFICATION SERVICE

(71) Applicant: AT&T Intellectual Property I, L.P., Atlanta, GA (US)

(72) Inventors: Qi Shen, New York, NY (US); Andrea G. Forte, Brooklyn, NY (US); Paul Giura, Cairo, NY (US); Mikhail Istomin, Brooklyn, NY (US); Evgene Vahlis, Toronto (CA); Wei Wang, Weehawken, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,250

(22) Filed: May 21, 2014

(65) Prior Publication Data

US 2014/0259112 A1    Sep. 11, 2014

Related U.S. Application Data

(63) Continuation of application No. 13/311,613, filed on Dec. 6, 2011, now Pat. No. 8,739,247.

(51) Int. Cl.
  *H04L 29/06* (2006.01)
(52) U.S. Cl.
  CPC ............... *H04L 63/08* (2013.01); *H04L 63/10* (2013.01); *H04L 63/126* (2013.01)
(58) Field of Classification Search
  CPC ........ H04L 63/08; H04L 63/10; H04L 63/126
  See application file for complete search history.

(56) References Cited

U.S. PATENT DOCUMENTS

| 2003/0212791 | A1 | 11/2003 | Pickup |
| 2005/0055409 | A1 | 3/2005 | Alsarraf et al. |
| 2007/0088793 | A1 | 4/2007 | Landsman |
| 2007/0094150 | A1 | 4/2007 | Yuen et al. |
| 2007/0107044 | A1* | 5/2007 | Yuen ..................... G06Q 20/40 726/2 |
| 2007/0275739 | A1 | 11/2007 | Blackburn |
| 2007/0289002 | A1* | 12/2007 | van der Horst ......... G06F 21/42 726/9 |
| 2008/0059375 | A1 | 3/2008 | Abifaker |

(Continued)

OTHER PUBLICATIONS

SpamArrest, www.spamarrest.com, retrieved Nov. 20, 2011, 3 pages.

(Continued)

*Primary Examiner* — William Goodchild
(74) *Attorney, Agent, or Firm* — Hartman & Citrin LLC

(57) ABSTRACT

Concepts and technologies are disclosed herein for verifying sender information. According to various embodiments of the concepts and technologies disclosed herein, a verification service can determine, receive a request, or receive a call to verify sender information associated with data. The server computer generates and delivers a verification message to a sender device in response to determining that sender information verification is to be provided. The server computer receives a response indicating if the data was sent by the sender device. If the response indicates that the sender device did not send the data, the server computer can block delivery of the data, generate alarms or alerts, take other actions, and/or take no action. If the response indicates that the sender device sent the data, the server computer can deliver the data, provide a verification response to the recipient device, take no action, and/or take other actions.

20 Claims, 7 Drawing Sheets

(56) References Cited

U.S. PATENT DOCUMENTS

| | | |
|---|---|---|
| 2009/0138711 A1 | 5/2009 | Heimbigner |
| 2009/0157650 A1 | 6/2009 | Chow et al. |
| 2010/0125651 A1* | 5/2010 | Zapata .................... G06F 8/65 709/220 |

OTHER PUBLICATIONS

Mattathil, G.P., "Email Sensor Verification: Instead of Trying to Filter-Out Spam, Filter-In Real Email," Email Authentication Summit, Federal Trade Commission, Nov. 10, 2004.

Golan, T., "Sender Address Verification: Solving the Spam Crisis," http://www.circleid.com/posts/sender_address_verification_solving_the_spam_crisis/; Jul. 26, 2004.

Parfeni, L., "Gmail Adds 'Super-Trustworthy' Email Sender Verification," http://news.softpedia.com/news/Gmail-Adds-039-Super-Trustworthy-039-Email-Sender-Verification-116627.shtml; Jul. 14, 2009.

Tauberer, J., "Thunderbird Sender Verification Extension," http://razor.occams.info/code/spf/ retrieved Nov. 20, 2011.

U.S. Office Action mailed on Jan. 17, 2013 in U.S. Appl. No. 13/311,613.

U.S. Office Action mailed on Apr. 26, 2013 in U.S. Appl. No. 13/311,613.

U.S. Office Action mailed on Sep. 30, 2013 in U.S. Appl. No. 13/311,613.

U.S. Notice of Allowance mailed on Jan. 7, 2014 in U.S. Appl. No. 13/311,613.

* cited by examiner

VERIFICATION SERVICE

CROSS-REFERENCE TO RELATED APPLICATION

This application is a continuation of U.S. patent application Ser. No. 13/311,613, entitled "Verification Service," filed on Dec 6, 2011, now U.S. Pat. No. 8,739,247, which is incorporated herein by reference in its entirety.

BACKGROUND

This application relates generally to data delivery. More specifically, the disclosure provided herein relates to a verification service for providing data delivery with sender verification.

Sender spoofing includes activity where headers or other information associated with emails, messages, or other content is altered. The altered headers or other information can indicate, for example, a source of the content that differs from an actual source of the content. While sender spoofing can be used for legitimate purposes, sender spoofing is often associated with fraudulent or other illegitimate activity such as phishing emails, various forms of cyber attacks, unsolicited bulk emails ("UBE" or Spam), and/or other activity. As such, some software and devices are configured to detect sender spoofing and block delivery of content if sender spoofing is detected.

Various sender spoofing detection techniques can fail, however, in certain circumstances. For example, if an email account is compromised, illegitimate activity can originate from a valid email address and thus may go undetected by sender spoofing detection devices or applications. As such, a compromised email address and/or user identity may be used by an attacker to send phishing messages, UBE, or other content. Because the activity originates from a legitimate address and/or is associated with a legitimate identity, some sender spoofing techniques may be unable to detect the fraudulent or illegitimate activity.

Furthermore, some sender spoofing detection techniques may block legitimate activity that makes use of techniques sometimes used by malicious attackers, even if these techniques are used for legitimate purposes. For example, a user may indicate a "reply-to" address that differs from a "sent-from" address for various legitimate purposes such as, for example, relaying an SMS message via a website, sending a business email from a home email address, and the like. In these and other cases, the real source of the content and the indicated source may differ and therefore may be blocked by some sender spoofing detection techniques.

SUMMARY

The present disclosure is directed to a verification service for providing data delivery with sender verification. According to various embodiments of the concepts and technologies disclosed herein, a sender device can send messages, attachments, shared files, content, and/or other data ("data") to a recipient device. In some embodiments, the data passes through or is delivered to a server computer configured to execute a verification service for providing the sender verification described herein. The verification service can be executed by a server computer in communication with one or more of the sender device, the recipient device, and/or other devices, and can be triggered, requested, called, or otherwise invoked.

In some embodiments, the verification service provides sender verification based upon contents of the data, based upon triggers or rules stored at the server computer, in response to an application or program call, and/or in response to requests from the recipient device. In response to determining that sender verification is to be completed, the verification service can generate a verification message for delivery to the sender device. The sender device or a user of the sender device ("sender") can review the verification message, determine if the data was sent by the sender and/or the sender device, and/or generate a response for delivery to the server computer.

The response generated by the sender device can indicate if the data was sent by the sender and/or the sender device. If the response indicates that the sender and/or the sender device did not send the data, the server computer can block delivery of the data, generate alarms or alerts, take no action, and/or take other actions. If the response indicates that the sender and/or the sender device sent the data, the server computer can deliver the data, provide a verification response to the recipient device, take no action, or take other actions. The server computer also can be configured to track usage of the verification service for performance tracking, billing or charging purposes, network performance statistics tracking, and/or other purposes.

According to one aspect of the concepts and technologies disclosed herein, a method is disclosed. The method can include receiving data from a sender device and determining if sender verification is to be completed for the data. The method can include sending a verification message to the sender device, in response to determining that sender verification is to be completed for the data. The method also can include receiving a response from the sender device indicating if the sender device sent the data. In some embodiments, the data is received at a server computer and can be intended for delivery to a recipient device. In some embodiments, determining that the sender verification is to be completed can include determining, based upon the data and verification data stored at the server computer, that the sender verification is to be completed.

According to various embodiments, the data is received at the server computer via a first communication channel, the verification message is sent to the sender device via a second communication channel, and the response is received at the server computer via the second communication channel. The method further can include delivering the data to the recipient device and receiving a verification request from the recipient device. The method also can include determining, based upon the response, if the sender is verified for the data. If the sender is determined to be verified for the data, the method can include allowing delivery of the data to the recipient device. If the sender is not verified for the data, the method can include blocking delivery of the data to the recipient device. In some embodiments, the method further includes delivering the data to the recipient device.

According to another aspect of the concepts and technologies disclosed herein, another method is disclosed. The method can include receiving, at a server computer, data for delivery to a recipient device. The data can be received at the server computer via a first communication channel. The method also can include determining if sender verification is to be completed for the data and, in response to determining that sender verification is to be completed for the data, sending a verification message to a sender device associated with the data. The verification message can be sent to the sender device via a second communication channel. The method also can include receiving a response from the sender device. The response can include data indicating if the sender device sent the data.

In some embodiments, the data includes an electronic message, the server computer includes a mail server configured to deliver the electronic message to the recipient device, and determining that the sender verification is to be completed includes determining, based upon contents of the electronic message and verification data stored at the mail server, that the sender verification is to be completed. The method further can include determining, based upon the response, if the sender is verified for the electronic message. If the sender is verified for the electronic message, the method further can include delivering the electronic message to the recipient device. If the sender is not verified for the electronic message, the method further can include not delivering the electronic message to the recipient device.

In some embodiments, the server computer includes a verification server configured to execute a verification service. In these embodiments, determining that the sender verification is to be completed can include executing the verification service to determine, based upon the data and verification data stored at the verification server, that the sender verification is to be completed. The method also can include determining, based upon the response, if the sender is verified for the data. If the sender is verified for the data, the method further can include allowing delivery of the data to the recipient device. If the sender is not verified for the data, the method further can include not delivering the data to the recipient device. The method also can include storing usage data indicating usage of the server computer by the recipient device and transmitting the usage data to a charging system in communication with the verification server.

In some embodiments, the method further can include allowing delivery of the data to the recipient device, and determining that the sender verification is to be completed can include receiving, from the recipient device, a verification request. In some embodiments, the first communication channel includes a primary communication channel between the sender device and the recipient device, the second communication channel includes a secondary communication channel between the server computer and the sender device, and the response is received at the server computer via the secondary communications channel. In some embodiments, the primary communication channel includes the server computer.

According to yet another aspect, a computer storage medium is disclosed herein. The computer storage medium can have computer-executable instructions stored thereon that, when executed by a server computer, cause the server computer to execute a method including recognizing data received at the server computer as data to be delivered to a recipient device, determining if sender verification is to be completed for the data, in response to determining that sender verification is to be completed for the data, sending a verification message to a sender device associated with the data, and receiving a response from the sender device, the response including data indicating if the sender device sent the data.

In some embodiments, the server computer is configured to execute a verification service, and determining that the sender verification is to be completed includes executing the verification service to determine, based upon contents of the data and verification data stored at the server computer, that the sender verification is to be completed. In some embodiments, the method executed by the server computer can include determining, based upon the response, if the sender is verified for the data. If the sender is verified for the data, the method can include allowing delivery of the data to the recipient device. If the sender is not verified for the data, the method can include blocking delivery of the data to the recipient device. In some embodiments, the method executed by the server computer can include allowing delivery of the data to the recipient device via a first communication channel, receiving a verification request from the recipient device via a second communication channel, generating, based at least partially upon the response, a verification response for the recipient device, and delivering the verification response to the recipient device via the second communication channel.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to verification service for providing data delivery with sender verification. According to various embodiments of the concepts and technologies disclosed herein, a sender device sends data to a recipient device. A verification service executed by a stand-alone device and/or by a device delivering the data can be called or invoked to verify sender information associated with the data. In some embodiments, the verification service provides sender verification based upon contents of the data, based upon triggers or rules stored at the server computer, in response to an application or program call, and/or in response to a request by the recipient device. In response to determining that sender verification is to be performed for the data, the server computer generates and delivers a verification message to the sender device.

The sender device or a user of the sender device ("sender") can review the verification message, determine if the data was sent by the sender and/or the sender device, and generate a response for delivery to the server computer. The response can indicate if the data was sent by the sender and/or the sender device. If the response indicates that the sender and/or the sender device did not send the data, the server computer can block delivery of the data, generate alarms or alerts, take no action, and/or take other actions. If the response indicates that the sender and/or the sender device sent the data, the server computer can deliver the data, provide a verification response to the recipient device, take no action, and/or take other actions. The server computer also can be configured to track usage of the verification service for performance tracking, billing or charging purposes, network performance statistics tracking, and/or other purposes.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
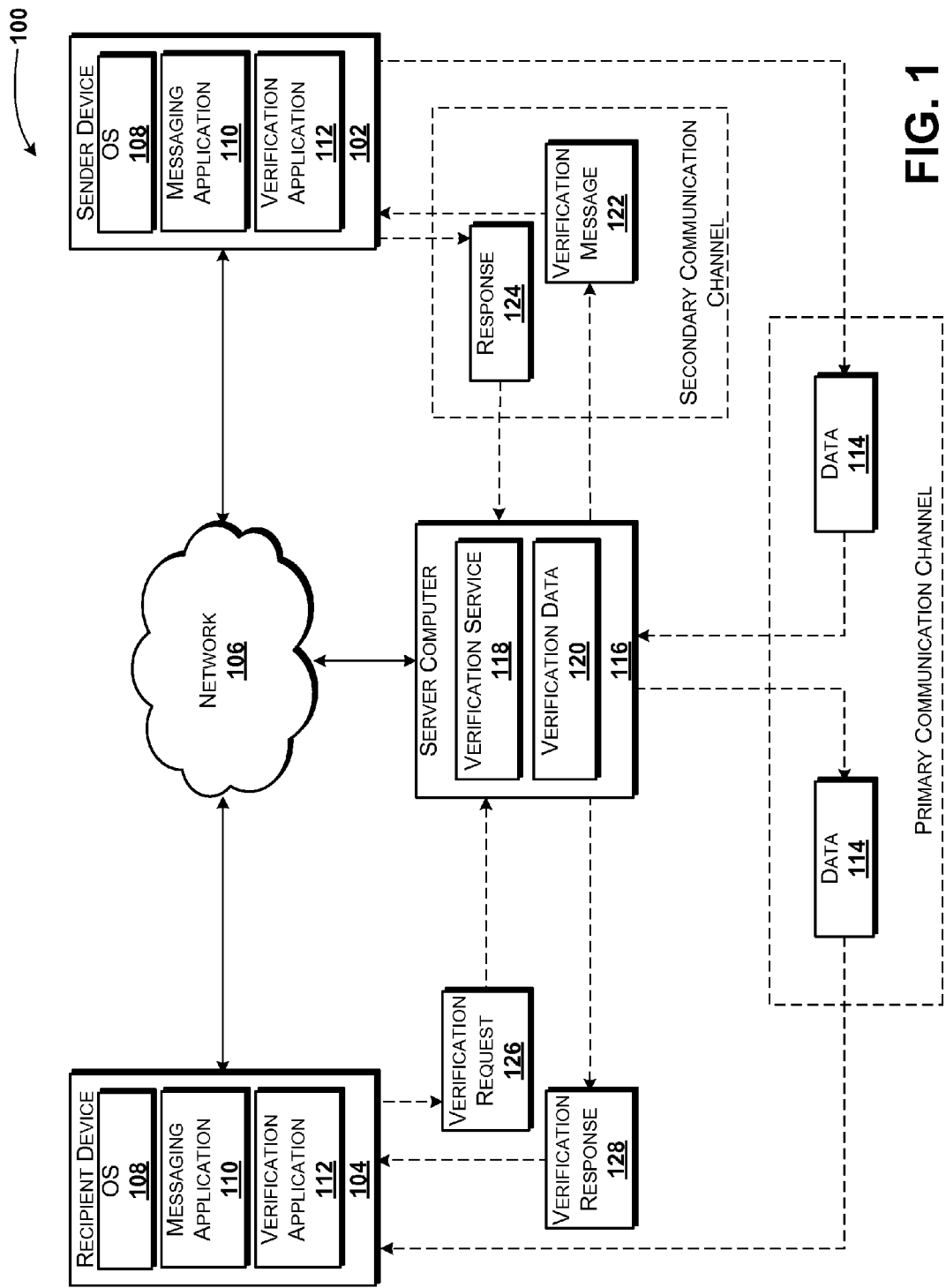
FIG. 1 is a system diagram illustrating an illustrative operating environment for the various embodiments disclosed herein.

Referring now to FIG. 1, aspects of an operating environment 100 for various embodiments of the concepts and technologies disclosed herein for a verification service for providing data delivery with sender verification will be described, according to an illustrative embodiment. The operating environment 100 shown in FIG. 1 includes a sender device 102 and a recipient device 104. According to various embodiments, the sender device 102 and the recipient device 104 are configured to communicate with one another, as well as with other nodes, devices, and/or services operating in communication with or as part of a communications network ("network") 106.

According to various embodiments, the functionality of the sender device 102 and/or the recipient device 104 described herein may be provided by one or more server computers, desktop computers, mobile telephones, laptop computers, set-top boxes, other computing systems, and the like. It should be understood that the functionality of the sender device 102 and the recipient device 104 can be provided by a single device, by two similar devices, and/or two or more dissimilar devices. For purposes of describing the concepts and technologies disclosed herein, the sender device 102 and the recipient device 104 are described herein as personal computers. Furthermore, because the sender device 102 and the recipient device 104 can be provided by similar or even identical devices, the sender device 102 is described in detail herein as illustrative of a device suitable for providing the functionality of the sender device 102 and/or the recipient device 104. It should be understood that this embodiment is illustrative, and should not be construed as being limiting in any way.

The sender device 102 can execute an operating system 108 and one or more application programs such as, for example, a messaging application 110 and a verification application 112. The operating system 108 is a computer program for controlling the operation of the sender device 102. The application programs are executable programs configured to execute on top of the operating system 108 to provide various functions. The messaging application 110 can include various messaging or other data transfer applications such as, for example, email applications, instant messaging applications, data sharing applications, file transfer applications, combinations thereof, and the like. For purposes of describing the concepts and technologies disclosed herein, the messaging application 110 is described herein as an email application that is configured to transmit, trigger transmission of, and/or receive content such as an email message, an attachment, an executable file, multimedia files, other data, or the like ("data") 114. It should be understood that this embodiment is illustrative, and should not be construed as being limiting in any way.

The verification application 112 is configured to receive or generate requests for verifying sender information associated with data 114 sent by the sender device 102 and/or received by the recipient device 104. As will be explained in more detail below, the sender device 102 can receive a request to verify sender information for data 114 received by the recipient device 104 and/or for data 114 that is indicated as deliverable to the recipient device 104. In some embodiments, the sender verification described herein is requested by the recipient device 104. In other embodiments, the sender verification described herein is requested by a mail server, service, or application; by a verification server, service, or application; and/or by other devices, services, applications, or nodes operating on, as part of, and/or in communication with the network 106.

In some embodiments, for example, the operating environment 100 includes a server computer 116 that operates as a part of or in communication with the network 106. The functionality of the server computer 116 can be provided by one or more server computers, virtual server computers, and/or other real or virtual computing resources. According to various implementations, the server computer 116 stores, executes, and/or hosts a verification service 118 for generating or receiving requests to verify a sender of data 114. The server computer 116 also can be configured to store, host, or access verification data 120.

In some embodiments, the server computer 116 is a mail server that is configured to deliver messages, attachments, and/or other data 114 to the recipient device 104. Thus, the verification service 118 can be provided by a module executed by the server computer 116, wherein the server computer 116 also provides functionality associated with a web server, a mail server, or other system or device. In other embodiments, the server computer 116 is a verification server that is configured to provide sender verification for data 114 on-demand. Because the functionality described herein for verifying a sender of the data 114 can be triggered or executed at any time by various devices, applications, and/or network nodes, it should be understood that these embodiments are illustrative, and should not be construed as being limiting in any way.

In the embodiments described herein, the verification service 118 is configured to receive or generate requests to verify sender information associated with data 114 intended for delivery to the recipient device 104. In some embodiments, the verification service 118 generates a verification message 122 for delivery to the sender device 102 or another device associated with a sender. The verification message 122 includes identification of the data 114 for which sender verification is requested. The verification message 122 can be received by the sender device 102 or another device associated with the sender and acted on by the messaging application 110, the verification application 112, and/or by other application programs.

In some implementations, the sender device 102 can determine if the data 114 for which sender verification is requested was sent by the sender device 102. In some embodiments, for example, the sender device 102 searches sent message folders, cached data, and/or other data to determine if the data 114 was sent by the sender device 102. In other embodiments, the sender device 102 or another device is configured to present a user interface ("UI") to a sender, and the sender verifies, or denies, that the sender sent the data 114. In other embodiments, for example, the sender can verify, using a first device, that the data 114 was sent by the sender using the first device or a second device associated with a sender. Because the sender and/or the sender device 102 can verify sender information for the data 114 in any number of ways, it should be understood that these embodiments are illustrative, and should not be construed as being limiting in any way. Furthermore, because the sender can verify that the data 114 was sent by the sender using any device, it should be understood that the illustrated embodiment, wherein a sender device 102 is used to send the data 114 and to verify that the data 114 was sent by the sender is illustrative, and should not be construed as being limiting in any way.

In the illustrated embodiment, the sender device 102 can respond to the verification message 122 with a response 124 indicating if the sender and/or the sender device 102 sent the data 114. The response 124 can include an indication that the data 114 was sent by the sender and/or the sender device 102, an indication that the data 114 was not sent by the sender and/or the sender device 102, a request for more information relating to the data 114, or other response. In some embodiments, the server computer 116 triggers the verification message 122 in response to a request associated with the recipient device 104. As such, the server computer 116 can send information included in the response 124 to the recipient device 104, if desired. In other embodiments, the server computer 116 triggers the verification message 122 before, during, or after delivery of the data 114, and may or may not provide information to the recipient device 104. In one embodiment, the response 124 includes a "valid response" from the sender and/or the sender device 102. A valid response can indicate that the data 114 was sent by the sender and/or the sender device 102 and may or may not be forward to the recipient device 104 when received by the server computer 116. It should be understood that this embodiment is illustrative, and should not be construed as being limiting in any way.

As mentioned above, the sender verification can be requested by a user of, or application program executing on, the recipient device 104. In some embodiments, for example, a user of the recipient device 104 may determine that an email message or other data 114 has suspicious contents, timing, or other aspects, and may request verification of the sender. In other embodiments, the recipient device 104 can be configured, for example via execution of the verification application 112, to request sender verification at certain times, under certain circumstances, or for each delivery of data 114. Because the recipient device 104 can request sender verification for various reasons and/or under various circumstances, it should be understood that these embodiments are illustrative, and should not be construed as being limiting in any way.

The recipient device 104 can generate a verification request 126 for transmission to the server computer 116. The server computer 116 can execute or request sender verification in response to the verification request 126. When sender verification is completed, the server computer 116 can provide a verification response 128 to the recipient device 104. The verification response 128 can indicate, for example, that the data 114 was sent by the sender and/or the sender device 102, that the data 114 was not sent by the sender and/or the sender device 102, and/or other responses. In one embodiment, the verification response 128 includes an alert to delete the data 114 and/or not to execute the data 114. Because other responses can be included in the verification response 128, it should be understood that this embodiment is illustrative, and should not be construed as being limiting in any way.

As shown in FIG. 1, the server computer 116 can communicate with the sender device 102 and/or the recipient device 104 via one or more communication channels. For example, in some embodiments the data 114 is transmitted from the sender device 102 to the recipient device 104 via a primary communication channel provided, in part, by the server computer 116. The verification message 122 and response 124 can be passed between the sender device 102 and the server computer 116 via a secondary communication channel. The verification request 126 and the verification response 128 can be passed between the recipient device 104 and the server computer 116 via the primary communication channel, a secondary communication channel, a tertiary communication channel (not shown) or other communication channel (not shown). In some embodiments, use of the secondary communication channel to perform or request the sender verification described herein can help enhance the performance of the sender verification by communicating with the sender device 102 out-of-band relative to the transmission of the data 114, though this is not necessarily the case. Because communications between the various devices shown in FIG. 1 can occur over any type of communication channel, it should be understood that the location and assignment of the "primary communication channel" and the "secondary communication channel" are illustrative and should not be construed as being limiting in any way.

The verification data 120 illustrated in FIG. 1 can include various data associated with and/or used by the server computer 116. According to various embodiments, the verification data 120 includes blacklists such as, for example, IP address blacklists, sender blacklists, and the like; data contents that trigger sender verification such as message contents, sender information, recipient information, message titles, embedded link information, or the like; verification algorithms that, when applied to data 114 by the verification service 118, determine if sender verification should be provided; usage statistics; account information; combinations thereof; or the like. While the verification data 120 is illustrated as being stored at the server computer 116, it should be understood that this is not necessarily the case. In particular, the verification data 120 can be stored at other data storage devices such as, for example, a memory device, a mass storage device, a server computer, a database, a datastore, computer readable media (as defined herein), other storage systems, and/or the like. As such, the illustrated embodiment should be understood as being illustrative, and should not be construed as being limiting in any way.

FIG. 1 illustrates one sender device 102, one recipient device 104, one network 106, and one server computer 116. It should be understood, however, that various implementations of the operating environment 100 include multiple sender devices 102, multiple recipient devices 104, multiple networks 106, and/or multiple server computers 116. As such, the illustrated embodiment should be understood as being illustrative, and should not be construed as being limiting in any way.

Figure 2:
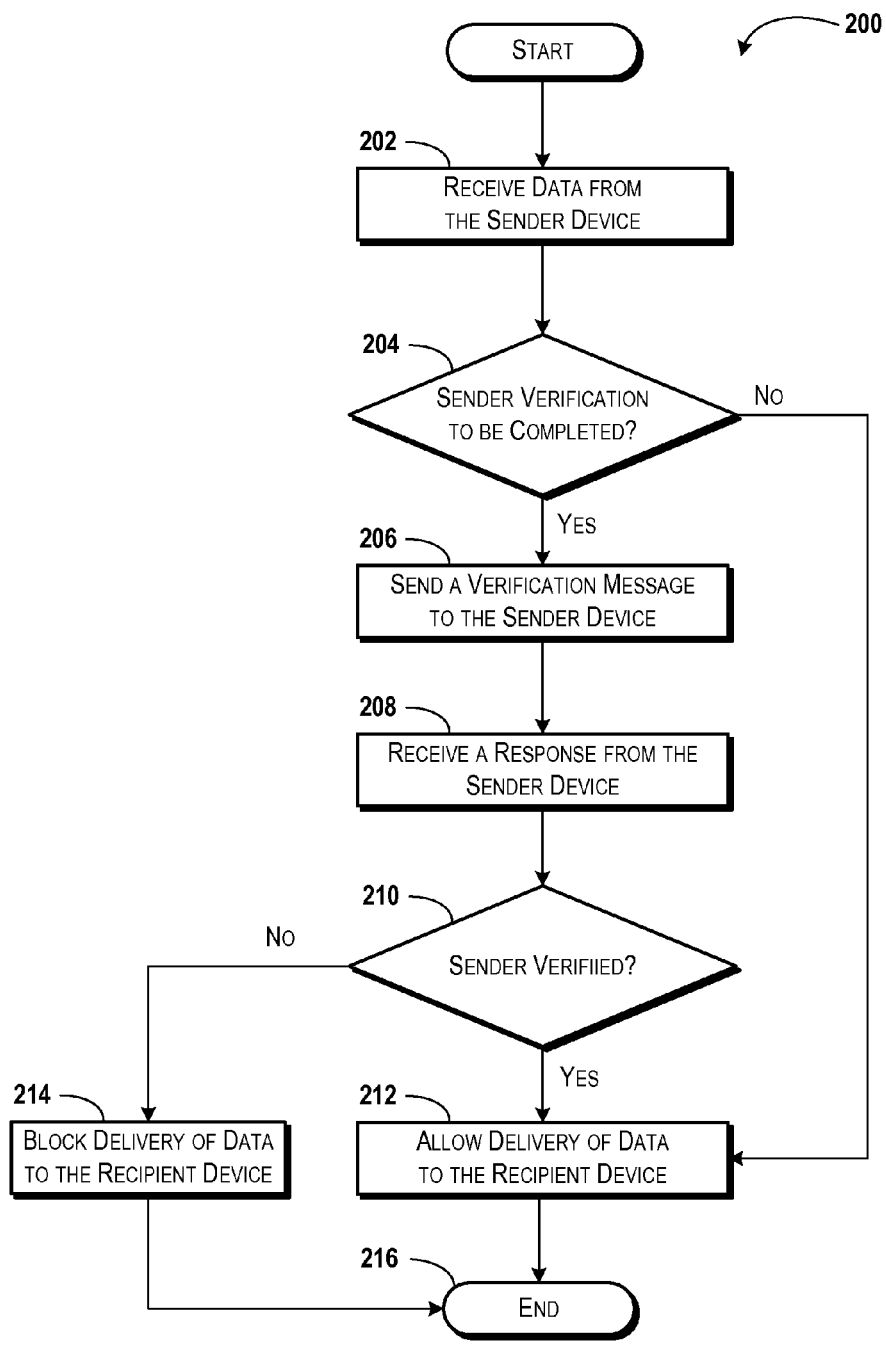
FIG. 2 is a flow diagram showing aspects of a method for providing a verification service, according to an illustrative embodiment.

Turning now to FIG. 2, aspects of a method 200 for providing a verification service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the methods disclosed herein are described as being performed by the server computer 116 via execution of one or more software modules such as, for example, the verification service 118. It should be understood that additional and/or alternative devices and/or network nodes can provide the functionality described herein via execution of one or more modules, applications, and/or other software including, but not limited to, the verification service 118. Thus, the illustrated embodiments are illustrative, and should not be viewed as being limiting in any way.

The method 200 begins at operation 202, wherein the server computer 116 receives data 114 from the sender device 102. According to various implementations, the data 114 corresponds to an email message. In other implementations, the data 114 corresponds to a file the sender device 102 is transmitting, or attempting to transmit, to the recipient device 104. Thus, the concepts and technologies disclosed herein can be implemented to verify communications between users of a peer-to-peer file transfer service, if desired. Because the concepts and technologies disclosed herein can be used with additional and/or alternative data transfer operations, it should be understood that these embodiments are illustrative, and should not be construed as being limiting in any way.

In some embodiments, the verification service 118 hosted by the server computer 116 is called by a mail server, application server, peer-to-peer sharing server, or other real or virtual device operating in communication with the server computer 116. In other embodiments, the server computer 116 hosting the verification service 118 also hosts a mail, application, peer-to-peer, or other application or service. As such, the verification service 118 can be called by these or other applications or services with an application call. Because the data 114 can be received at the server computer 116 in a number of ways, it should be understood that these embodiments are illustrative, and should not be construed as being limiting in any way.

From operation 202, the method 200 proceeds to operation 204, wherein the server computer 116 determines if sender verification is to be completed for the data 114 received in operation 202. According to various embodiments, the server computer 116 determines that sender verification is to be completed by determining that sender verification is needed, desired, or required for a communication based upon sender information, recipient information, subject information, presence of executable content, contents of the data 114, or otherwise; by randomly applying sender verification to communications received at the server computer 116; in response to an application or service call; based on data in an IP address blacklist; for other reasons; and the like.

In some embodiments, the server computer 116 executes a sender verification algorithm that, based upon the data 114, triggers the server computer 116 to apply, or skip, the sender verification functionality described herein. In other embodiments, the server computer 116 is configured to apply sender verification to all data 114 and/or completes sender verification for other reasons. As such, it should be understood that these embodiments are illustrative, and should not be construed as being limiting in any way.

If the server computer 116 determines, in operation 204, that server verification is to be completed, the method 200 proceeds to operation 206, wherein the server computer 116 sends a verification message 122 to the sender device 102. As explained above with regard to FIG. 1, the verification message 122 can be sent to other devices associated with a sender and/or to an account or application associated with the sender instead of, or in addition to, being sent to the sender device 102. Thus, the example provided herein, wherein the sender sends the data 114 and verifies sending of the data 114 using the sender device 102, should be understood as being illustrative, and should not be construed as being limiting in any way.

According to various embodiments, the sender device 102 or other device used by the sender can be configured to recognize and respond to the verification message 122. For example, in the embodiment illustrated in FIG. 1, the sender device 102 executes a verification application 112 that is configured to recognize the verification message 122. The verification application 112 or similar functionality also can recognize data 114 referenced by the verification message 122, prompt the sender or search send logs for the data 114, and determine or receive input from the sender indicating if the data 114 is legitimate.

The verification application 112 also can be configured to respond to the verification message with data indicating if the data 114 is legitimate or not legitimate. As such, operation 206 can include waiting for a response from the sender device 102 or another device associated with the sender of the data 114. Because a response 124 may or may not be immediately returned, operation 206 can include a pause in execution of the method 200 until the response 124 is received.

From operation 206, the method 200 proceeds to operation 208, wherein the server computer 116 receives a response 124 from the sender and/or the sender device 102. From operation 208, the method 200 proceeds to operation 210, wherein the server computer 116 determines, based upon the response 124 received in operation 208, if the sender is verified for the data 114 received in operation 202. In some embodiments, the server computer 116 determines if the response 124 received in operation 208 indicates that the data 114 is legitimate or not, and determines that the sender is verified for the data 114 if the response 124 indicates that the data 114 is legitimate. In other embodiments, the server computer 116 determines that the sender is verified if the sender confirms that the data 114 was sent by the sender and/or the sender device 102 purposefully or with permission. Because the determination of operation 208 can be made in any number of ways, it should be understood that these embodiments are illustrative, and should not be construed as being limiting in any way.

If the server computer 116 determines, in operation 210, that the sender is verified for the data 114, the method 200 proceeds to operation 212. The method 200 also can proceed to operation 212 if the server computer 116 determines, in operation 204, that server verification is not to be completed. In operation 212, the server computer 116 can allow delivery of the data 114 to the recipient device 104. Although not illustrated in FIG. 2, the server computer 116 can store various data relating to usage of the server computer 116 for various purposes. For example, the server computer 116 can store data relating to usage of the verification service 118 for billing, tracking, network planning, and/or other purposes.

If the server computer 116 determines, in operation 210, that the sender is not verified for the data 114, the method 200 proceeds to operation 214. In operation 214, the server computer 116 can block delivery of the data 114 to the recipient device 104. Although not shown in FIG. 2, the server computer 116 can generate notifications or alerts, add senders or IP addresses to one or more logs or lists, block traffic from the sender device 102, and/or take other actions upon determining that a sender is not verified. The server computer 116 also can store usage, billing, tracking, and/or other data, as noted above with regard to operation 212.

More particularly, in one embodiment the server computer 116 is a verification server configured to execute the verification service 118. The verification server can track usage of the verification service 118. In some embodiments, the verification server stores usage data that indicates usage of the verification service 118 by the recipient device 104. The verification server can transmit the usage data to a billing and/or charging system for billing, charging, or other purposes. It should be understood that this embodiment is illustrative, and should not be construed as being limiting in any way.

From operation 212, the method 200 proceeds to operation 216. The method 200 also can proceed to operation 216 from operation 214. The method 200 ends at operation 216.

Figure 3:
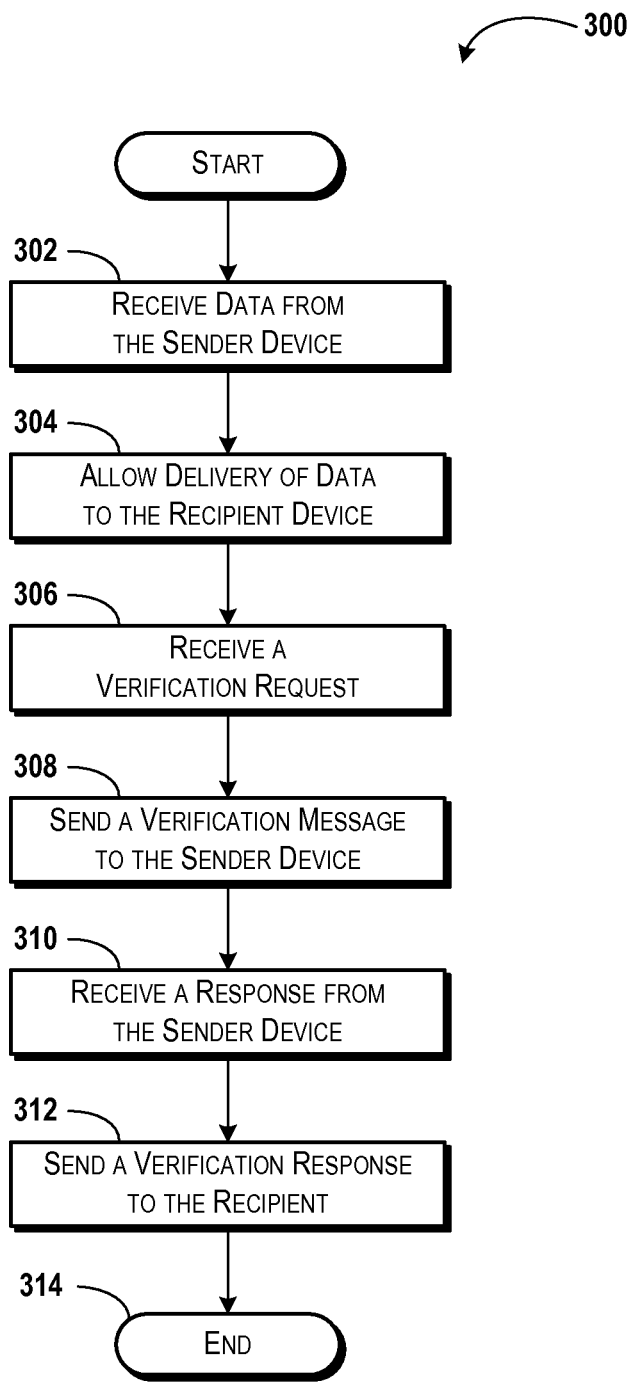
FIG. 3 is a flow diagram showing aspects of a method for providing a verification service, according to another illustrative embodiment.

Turning now to FIG. 3, aspects of a method 300 for providing a verification service will be described in detail, according to another illustrative embodiment. The method 300 begins at operation 302, wherein the server computer 116 receives data 114 from the sender device 102. It should be understood that operation 302 can be, but is not necessarily, similar or even identical to operation 202 described above with regard to FIG. 2.

From operation 302, the method 300 proceeds to operation 304, wherein the server computer 116 allows delivery of the data 114. As explained above with regard to FIG. 2, the server computer 116 can manage delivery of the data 114 and therefore can release the data 114 for delivery. In other embodiments, the server computer 116 is called to perform sender verification and therefore can issue a command or response to the device that called the server computer 116 with an indication that the data 114 is allowed for delivery. Other methods for allowing delivery of the data 114 are possible and contemplated. As such, these embodiments are illustrative, and should not be construed as being limiting in any way.

From operation 304, the method 300 proceeds to operation 306, wherein the server computer 116 receives a verification request 126 or other request to verify the sender of the data 114. According to various embodiments, the verification request 126 is received from the recipient device 104. It should be understood that the verification request 126 received in operation 306 can be received from other devices or entities. As such, it should be understood that this embodiment is illustrative, and should not be construed as being limiting in any way.

From operation 306, the method 300 proceeds to operation 308, wherein the server computer 116 sends a verification message 122 to the sender device 102. From operation 308, the method 300 proceeds to operation 310, wherein the server computer 116 receives a response 124 from the sender device 102. It should be understood that operations 308-310 can be, but are not necessarily, similar or even identical to operations 206-208 described above with regard to FIG. 2.

From operation 310, the method 300 proceeds to operation 312, wherein the server computer 116 sends a verification response 128 to the recipient device 104. The verification response 128 can indicate that the sender has been verified, that the sender has not been verified or other information. As such, the verification response 128 can include a response to the verification request 126 received in operation 306. From operation 312, the method 300 proceeds to operation 314. The method 300 ends at operation 314.

Although not shown in FIG. 3, it should be understood that the server computer 116 can take various actions in addition to, or instead of, providing the verification response 128 as described above with reference to operation 312. For example, if the server computer 116 determines that the sender is not verified, the server computer 116 can add an IP address of the sender device 102 to an IP address blacklist; block future communications from the sender and/or the sender device 102; inform the recipient device 104 to delete the data 114; add contents of the data 114 to a filtering mechanism; and/or take other actions. As such, the illustrated embodiment of FIG. 3, wherein the server computer 116 provides the verification response 128, is illustrative and should not be construed as being limiting in any way.

Figure 4:
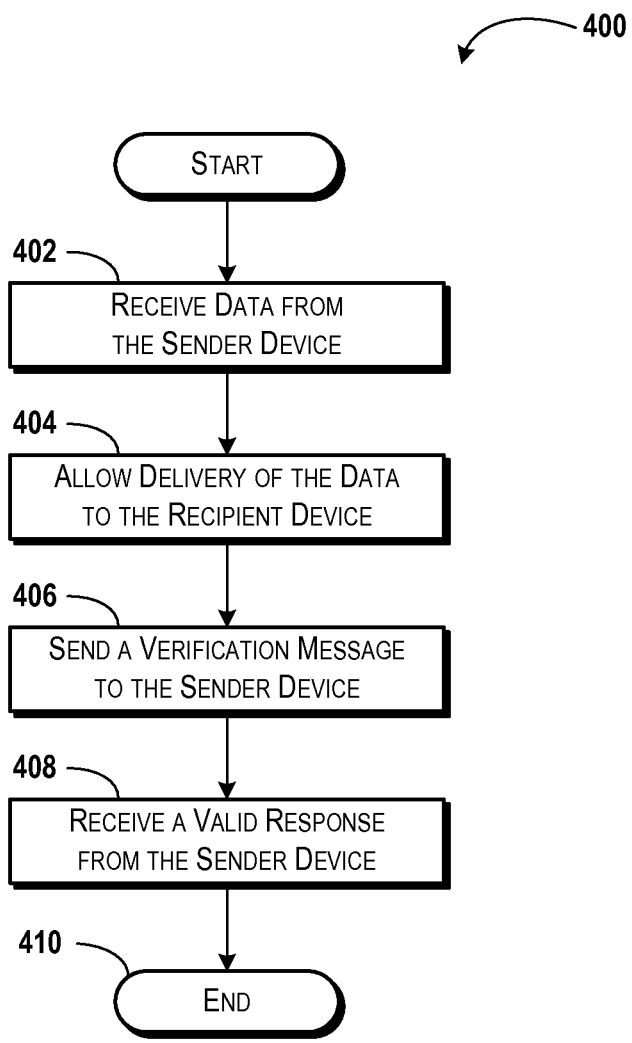
FIG. 4 is a flow diagram showing aspects of a method for providing a verification service, according to another illustrative embodiment.

Turning now to FIG. 4, aspects of a method 400 for providing a verification service will be described in detail, according to yet another illustrative embodiment. The method 400 begins at operation 402, wherein the server computer 116 receives data 114 from the sender device 102. It should be understood that operation 402 can be, but is not necessarily, similar or even identical to operations 202 and 302 described above with reference to FIGS. 2 and 3, respectively.

From operation 402, the method 400 proceeds to operation 404, wherein the server computer 116 allows delivery of the data 114 to the recipient device 104. As explained above, the server computer 116 can manage delivery of the data 114 and/or deliver the data 114. As such, in operation 404, the server computer 116 can release the data 114 for delivery to the recipient device 104. In other embodiments, the server computer 116 is called to perform sender verification by other devices or nodes that deliver the data 114 to the recipient device 104. As such, operation 404 can include the server computer 116 issuing a command or response to a device or node that called the server computer 116. The command or response can identify the data 114 and indicate that the data 114 is allowed for delivery. Other methods for allowing delivery of the data 114 are possible and contemplated. As such, these embodiments are illustrative, and should not be construed as being limiting in any way.

From operation 404, the method 400 proceeds to operation 406, wherein the server computer 116 sends a verification message 122 to the sender and/or the sender device 102. While the methods 200-300 described above were described and illustrated with reference to embodiments wherein the server computer 116 responded to a request to perform sender verification, the server computer 116 can also be configured to send the verification message 122 to the sender and/or the sender device 102 without requests, as shown in FIG. 4. Thus, the server computer 116 can be configured to trigger the sender verification when delivery of the data 114 is allowed and/or at other times.

From operation 406, the method 400 proceeds to operation 408, wherein the server computer 116 receives a response 124 from the sender and/or the sender device 102. In the embodiment illustrated in FIG. 4, the response 124 received in operation 408 indicates that the data 114 was sent by the sender and/or the sender device 102 and therefore indicates a valid response from the sender and/or the sender device 102. If the response 124 received from the sender and/or the sender device 102 indicates that the data 114 was not sent by the sender or the sender device 102, the server computer 116 can take various actions, as explained above with regard to FIG. 3.

Because the response 124 received in FIG. 4 indicates that the data 114 was sent by the sender and/or the sender device 102, the server computer 116 need not perform any additional actions. Furthermore, because the recipient device 104 is unaware and/or uninvolved in the method 400, the method 400 can be run in the background from the perspective of the recipient device 104. As such, the recipient device 104 may or may not know that the method 400 is being executed by the server computer 116. From operation 408, the method 400 proceeds to operation 410. The method 400 ends at operation 410.

Figure 5:
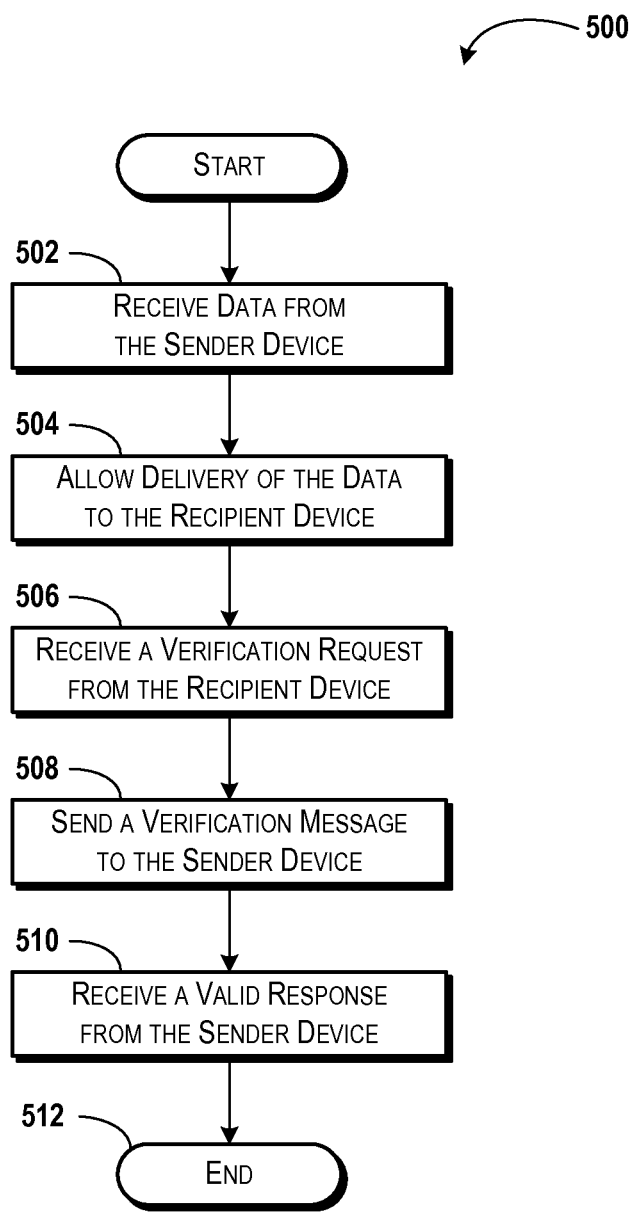
FIG. 5 is a flow diagram showing aspects of a method for providing a verification service, according to yet another illustrative embodiment.

Turning now to FIG. 5, aspects of a method 500 for providing a verification service will be described in detail, according to yet another illustrative embodiment. The method 500 begins at operation 502, wherein the server computer 116 receives data 114 from the sender device 102. From operation 502, the method 500 proceeds to operation 504, wherein the server computer 116 allows delivery of the data 114 to the recipient device 104. According to some embodiments, operations 502-504 are similar, or even identical, to operations 302-304 and 402-404 illustrated and described with reference to FIGS. 3 and 4, respectively, though this is not necessarily the case.

From operation 504, the method 500 proceeds to operation 506, wherein the server computer 116 receives a verification request 126 or other request to verify the sender of the data 114. In the embodiment illustrated in FIG. 5, the verification request 126 is received from the recipient device 104. It should be understood that the verification request 126 received in operation 306 can be received from other devices or entities in other embodiments, and as such, the illustrated embodiment should be understood as illustrative, and should not be construed as being limiting in any way.

From operation 506, the method 500 proceeds to operation 508, wherein the server computer 116 sends a verification message 122 to the sender and/or the sender device 102. From operation 508, the method 500 proceeds to operation 510, wherein the server computer 116 receives a response 124 from the sender and/or the sender device 102.

In the embodiment illustrated in FIG. 5, the response 124 received in operation 510 indicates that the data 114 was sent by the sender device 102 and is therefore illustrated in FIG. 5 as a "valid response" from the sender and/or the sender device 102. If the response 124 received from the sender device 102 indicates that the data 114 was not sent by the sender device 102, the server computer 116 can take various actions, as explained above with regard to FIG. 3. Because the response 124 received in FIG. 5 indicates that the data 114 was sent by the sender and/or the sender device 102, the server computer 116 need not perform any additional actions. From operation 510, the method 500 proceeds to operation 512. The method 500 ends at operation 512.

The above description has provided various embodiments in which the sending of data 114 is verified by a sender. While the above embodiments have referred to a sender device 102, it should be understood that a sender can use a first device such as the sender device 102 to send the data 114 and the same or a different device to verify that the sender sent the data 114. As such, some of the above embodiments, wherein the sender verifies sending of the data 114 using the sender device 102 should be understood as being illustrative, and should not be construed as being limiting in any way. Similarly, for purposes of the claims, a "sender device" refers to one, more than one, and/or a combination of devices associated with a sender. As such, the "sender device" as used in the claims includes, but is not limited to, a device used to send the data 114, a same or different device used by the sender to verify that the sender sent the data 114, other devices the sender may use in accordance with the various embodiments disclosed herein, and/or combinations thereof.

Figure 6:
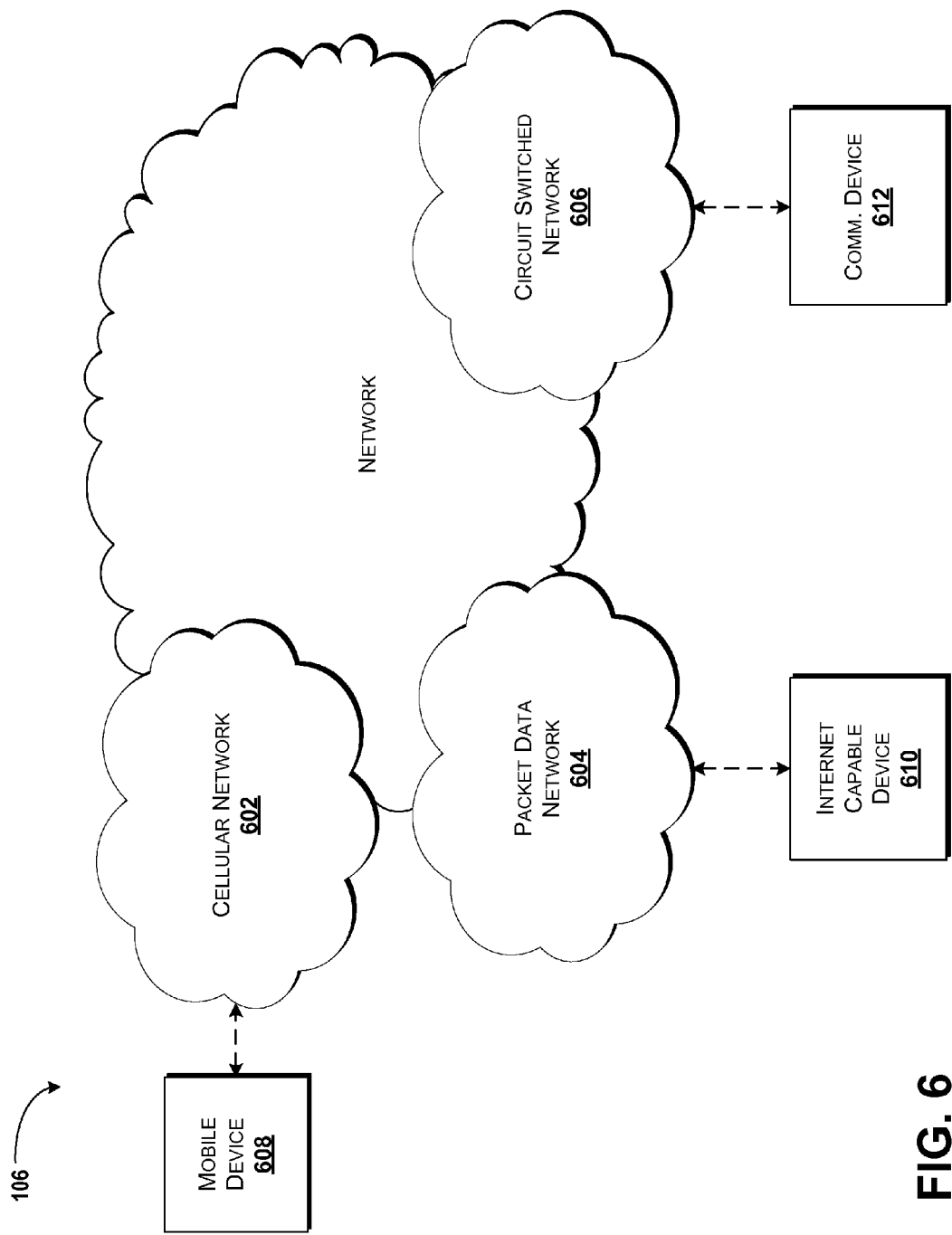
FIG. 6 schematically illustrates a network, according to an illustrative embodiment.

Turning now to FIG. 6, additional details of the network 106 are illustrated, according to an illustrative embodiment. The network 106 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device ("mobile device") 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 106 is used to refer broadly to any combination of the networks 602, 604, 606. It should be appreciated that substantially all of the functionality described with reference to the network 106 can be performed by the cellular network 602, the packet data network 604, and/or the circuit switched network 606, alone or in combination with other networks, network elements, and the like.

According to various implementations, the sender device 102 and/or the recipient device 104 can use any combination of the devices disclosed herein including, but not limited to, the mobile device 608, the Internet-capable device 610, and/or the communications device 612 to access web pages or other resources, to access the server computer 116, to transmit and/or receive the data 114, to transmit and/or receive the verification message 122, the response 124, the verification request 126, and/or the verification response 128, and/or for other interactions between the sender device 102, the recipient device 104, and/or the server computer 116. As such, it should be understood that the sender device 102 and the recipient device 104 can interact with one another and/or the server computer 116 via any number and/or combination of devices and networks.

Figure 7:
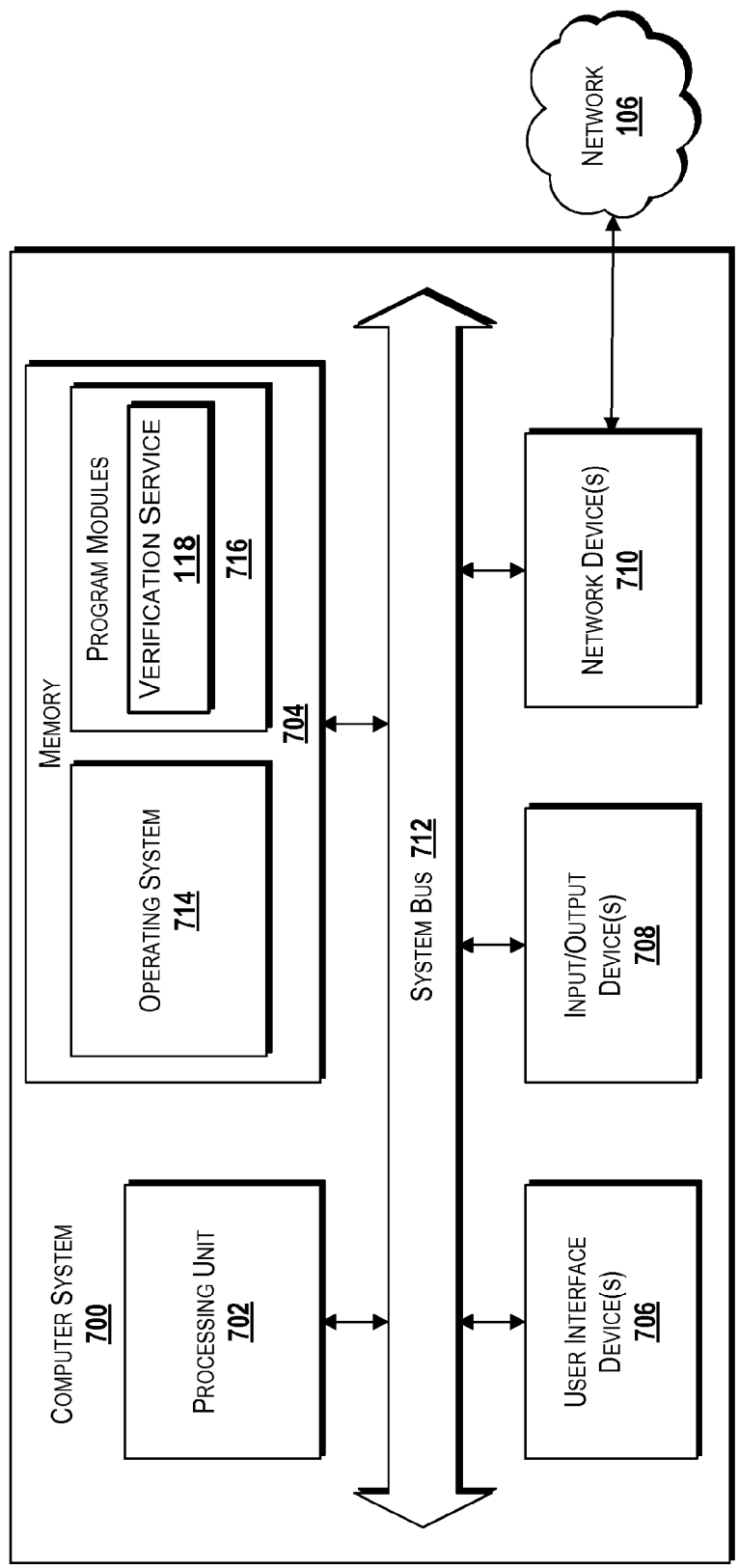
FIG. 7 is a block diagram illustrating an example computer system configured to provide a verification service, according to some illustrative embodiments.

FIG. 7 is a block diagram illustrating a computer system 700 configured to provide the functionality described herein for a verification service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the verification service 118. This and/or other programs can be embodied in computer-readable media containing instructions that, when executed by the processing unit 702, perform one or more of the methods 200, 300, 400, 500 described in detail above with respect to FIGS. 2-5. According to embodiments, the program modules 716 may be embodied in hardware, software, firmware, or any combination thereof. Although not shown in FIG. 7, it should be understood that the memory 704 also can be configured to store the verification data 120 and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof, does not include waves, signals, and/or other transitory and/or intangible communication media, per se.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 106. Examples of the network devices 710 include, but are not limited to, a modem, a radio frequency ("RF") or infrared ("IR") transceiver, a telephonic interface, a bridge, a router, or a network card. The network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a verification service have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A system comprising:
a processor; and
a memory that stores computer executable instructions that, when executed by the processor, cause the processor to perform operations comprising:
receiving, via a first communication channel, data from a sender device for delivery to a recipient device,
receiving, from the recipient device, a verification request,
determining, based upon the verification request, that sender verification is to be completed for the data,
if a determination is made that the sender verification is to be completed for the data, sending a verification message to the sender device via a second communication channel,
receiving a response from the sender device via the second communication channel, the response indicating if the sender device sent the data, and
allowing delivery of the data to the recipient device if the response indicates that the sender device sent the data.

2. The system of claim 1, wherein the data is received at a server computer.

3. The system of claim 1, wherein determining that the sender verification is to be completed comprises determining, based upon the data and verification data, that the sender verification is to be completed.

4. The system of claim 1, wherein the computer executable instructions, when executed by the processor, cause the processor to perform operations further comprising storing usage data.

5. The system of claim 4, wherein the computer executable instructions, when executed by the processor, cause the processor to perform operations further comprising transmitting the usage data to a charging system.

6. The system of claim 1, wherein the computer executable instructions that, when executed by the processor, cause the processor to perform operations further comprising:
determining, based upon the response, if a sender is verified for the data;
if a determination is made that the sender is verified for the data, allowing delivery of the data to the recipient device; and
if a determination is made that the sender is not verified for the data, blocking delivery of the data to the recipient device.

7. The system of claim 1, wherein the computer executable instructions, when executed by the processor, cause the processor to perform operations further comprising delivering the data to the recipient device.

8. The system of claim 1, wherein the first communication channel comprises a primary communication channel between the sender device and the recipient device, and wherein the second communication channel comprises a secondary communication channel between a server computer and the sender device.

9. The system of claim 8, wherein the primary communication channel comprises the server computer.

10. A device comprising:
a processor; and
a memory that stores computer executable instructions that, when executed by the processor, cause the processor to perform operations comprising:
receiving, via a first communication channel, data from a sender device for delivery to a recipient device,
receiving, from the recipient device, a verification request,
determining, based upon the verification request, that sender verification is to be completed for the data,
if a determination is made that the sender verification is to be completed for the data, sending a verification message to the sender device via a second communication channel,
receiving a response from the sender device via the second communication channel, the response indicating if the sender device sent the data, and
allowing delivery of the data to the recipient device if the response indicates that the sender device sent the data.

11. The device of claim 10, wherein the computer executable instructions, when executed by the processor, cause the processor to perform operations further comprising storing usage data.

12. The device of claim 11, wherein the computer executable instructions, when executed by the processor, cause the processor to perform operations further comprising transmitting the usage data to a charging device.

13. The device of claim 10, wherein the computer executable instructions, when executed by the processor, cause the processor to perform operations further comprising:
determining, based upon the response, if a sender is verified for the data;
if a determination is made that the sender is verified for the data, allowing delivery of the data to the recipient device; and
if a determination is made that the sender is not verified for the data, blocking delivery of the data to the recipient device.

14. The device of claim 10, wherein the computer executable instructions, when executed by the processor, cause the processor to perform operations further comprising delivering the data to the recipient device.

15. The device of claim 10, wherein the data is received at a server computer.

16. The device of claim 10, wherein determining that the sender verification is to be completed comprises determining, based upon the data and verification data, that the sender verification is to be completed.

17. The device of claim 10, wherein the first communication channel comprises a primary communication channel between the sender device and the recipient device, and wherein the second communication channel comprises a secondary communication channel between a server computer and the sender device.

18. A computer storage medium having computer executable instructions stored thereon that, when executed by a processor, cause the processor to execute operations comprising:
receiving data from a sender device for delivery to a recipient device, wherein the data is received via a first communication channel;
determining that sender verification is to be completed for the data;
in response to determining that the sender verification is to be completed for the data, sending a verification message to the sender device via a second communication channel;
receiving a response from the sender device, the response comprising data indicating if the sender device sent the data; and
allowing delivery of the data to the recipient device if the response indicates that the sender device sent the data.

19. The computer storage medium of claim 18, wherein the computer executable instructions, when executed by the processor, cause the processor to perform operations further comprising:
determining, based upon the response, if a sender is verified for the data;
if a determination is made that the sender is verified for the data, allowing delivery of the data to the recipient device; and
if a determination is made that the sender is not verified for the data, blocking delivery of the data to the recipient device.

20. The computer storage medium of claim 18, wherein the computer executable instructions, when executed by the processor, cause the processor to perform operations further comprising:
allowing delivery of the data to the recipient device via the first communication channel;
receiving a verification request from the recipient device, the verification request being received via the second communication channel;
generating, based upon the response, a verification response for the recipient device; and
delivering the verification response to the recipient device via the second communication channel.

* * * * *